(12) United States Patent
Kinsey et al.

(10) Patent No.: US 10,343,070 B2
(45) Date of Patent: Jul. 9, 2019

(54) ACCESS GRANT DETERMINATION DEVICES AND METHODS FOR DETERMINING ACCESS GRANT

(71) Applicant: RAZER (ASIA-PACIFIC) PTE. LTD., Singapore (SG)

(72) Inventors: Jeffrey Brian Kinsey, San Mateo, CA (US); Mark Tidd Lackey, San Francisco, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 15/528,279

(22) PCT Filed: Nov. 25, 2014

(86) PCT No.: PCT/SG2014/000555
§ 371 (c)(1),
(2) Date: May 19, 2017

(87) PCT Pub. No.: WO2016/085402
PCT Pub. Date: Jun. 2, 2016

(65) Prior Publication Data
US 2017/0319965 A1   Nov. 9, 2017

(51) Int. Cl.
*A63F 13/73* (2014.01)
*A63F 13/2145* (2014.01)
(Continued)

(52) U.S. Cl.
CPC .......... *A63F 13/73* (2014.09); *A63F 13/2145* (2014.09); *A63F 13/44* (2014.09);
(Continued)

(58) Field of Classification Search
CPC ...... A63F 13/73; A63F 13/2145; A63F 13/44; A63F 13/92; H04N 5/4403; H04N 2005/4442; H04N 2005/4425
(Continued)

(56) References Cited

U.S. PATENT DOCUMENTS 4,420,157 A * 12/1983 White .................. A63F 9/0098
273/272
5,695,400 A * 12/1997 Fennell, Jr. ............ A63F 13/12
463/42
(Continued)

FOREIGN PATENT DOCUMENTS

| CN | 101116782 A | 2/2008 |
|---|---|---|
| KR | 20040099825 A | 12/2004 |
| WO | 2008/090206 A2 | 7/2008 |

OTHER PUBLICATIONS

Nintendo, "Mario Party 4," https://web.archive.org/web/20070225040410/http://www.mariowiki.com:80/Domination, page captured Feb. 25, 2007.*
(Continued)

*Primary Examiner* — Kevin Y Kim
(74) *Attorney, Agent, or Firm* — Polsinelli PC

(57) ABSTRACT

According to various embodiments, an access grant determination device may be provided. The access grant determination device may include a game providing circuit configured to provide a request to start a game to a first user and to a second user. The access grant determination device may further include a winner determination circuit configured to determine a winner of the game. The access grant determination device may further include an access grant circuit configured to grant access to a device based on the determination of the winner of the game.

11 Claims, 8 Drawing Sheets

(51) Int. Cl.
*A63F 13/92* (2014.01)
*A63F 13/44* (2014.01)
*H04N 5/44* (2011.01)

(52) U.S. Cl.
CPC .......... *A63F 13/92* (2014.09); *H04N 5/4403* (2013.01); *H04N 2005/4425* (2013.01); *H04N 2005/4442* (2013.01)

(58) Field of Classification Search
USPC ............................................................ 463/7
See application file for complete search history.

(56) References Cited

U.S. PATENT DOCUMENTS

| | | | | |
|---|---|---|---|---|
| 5,796,393 | A * | 8/1998 | MacNaughton | G06F 17/3089 707/E17.116 |
| 7,828,661 | B1 | 11/2010 | Fish et al. | |
| 8,550,920 | B1 * | 10/2013 | Allen | G07F 17/3241 463/25 |
| 8,753,185 | B1 * | 6/2014 | Klappert | H04N 21/4781 463/19 |
| 2002/0072412 | A1 | 6/2002 | Young et al. | |
| 2006/0068862 | A1 | 3/2006 | Zheleznyakov | |
| 2006/0121965 | A1 | 6/2006 | MacIver | |
| 2007/0111789 | A1 | 5/2007 | van Deursen et al. | |
| 2007/0197280 | A1 | 8/2007 | Vali-Tepper | |
| 2008/0176652 | A1 | 7/2008 | Yoshizawa | |
| 2009/0228911 | A1 * | 9/2009 | Vrijsen | H04N 7/163 725/14 |

OTHER PUBLICATIONS

Extended European Search Report (eESR) dated Nov. 16, 2017 in corresponding European Patent Application No. 14906929.6, 9 pages.
"Remote Control—Free Online Funny Games from AddictingGames," launched Dec. 13, 2007 (Retrieved on May 25, 2017 from http://www.addictinggames.com/funny-gannes/remotecontrol.jsp).
"Remote Control Games—Play Free Skill Game Online," (Retrieved on May 25, 2017 http://www.oyunlar1.com/kumandakavgasi.aspx).

* cited by examiner

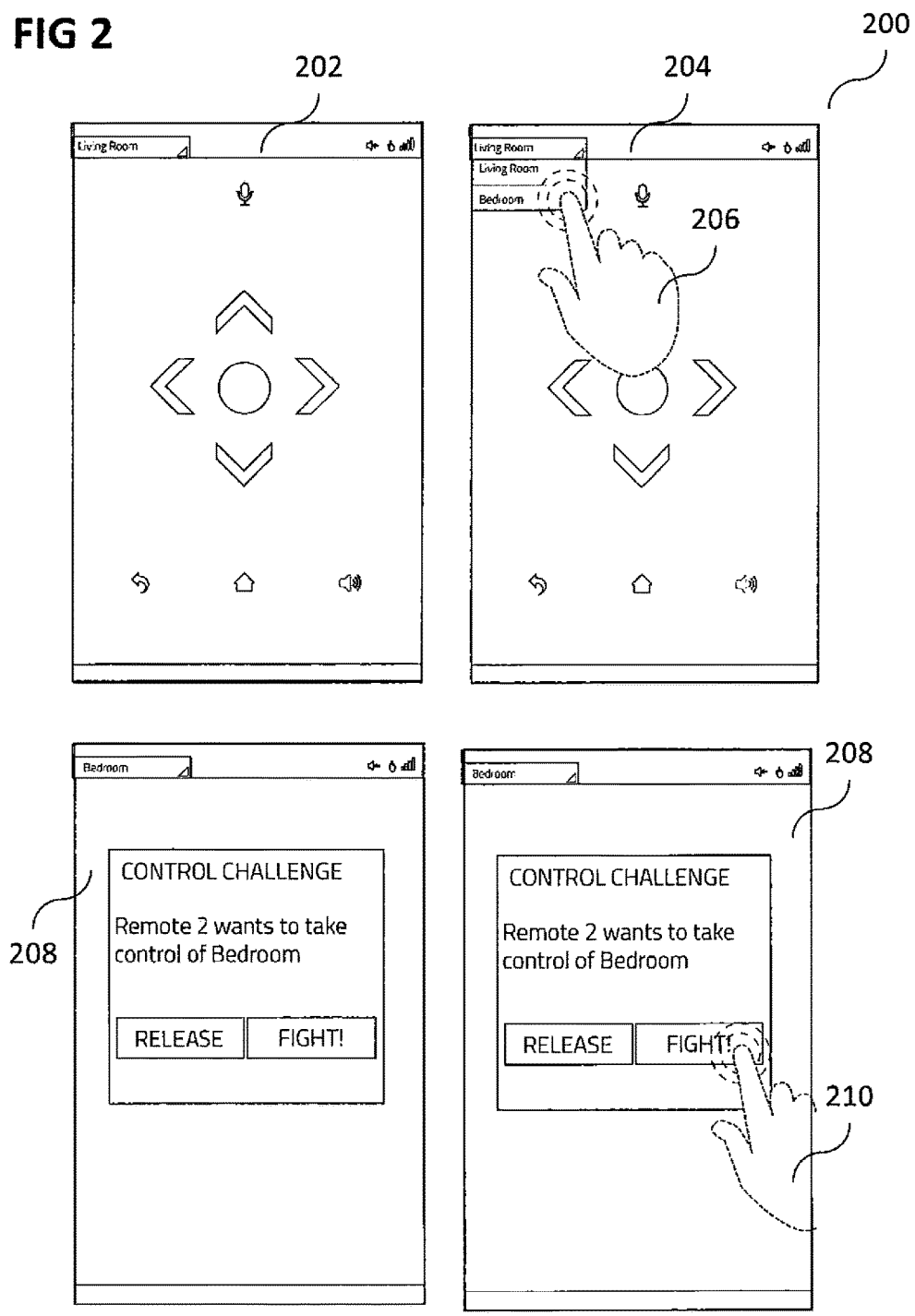

ACCESS GRANT DETERMINATION DEVICES AND METHODS FOR DETERMINING ACCESS GRANT

TECHNICAL FIELD

Various embodiments generally relate to access grant determination devices and methods for determining access grant.

BACKGROUND

When looking at a remote control (for example a TV remote control) as a software application, one cannot simply say "give me the remote", as they would be taking that person's personal computing device i.e. their smartphone or tablet. As such, there may be a need for a way to pass the remote control when using a remote control application without actually passing the device on which the remote control application is executed.

SUMMARY OF THE INVENTION

According to various embodiments, an access grant determination device may be provided. The access grant determination device may include a game providing circuit configured to provide a request to start a game to a first user and to a second user. The access grant determination device may further include a winner determination circuit configured to determine a winner of the game. The access grant determination device may further include an access grant circuit configured to grant access to a device based on the determination of the winner of the game.

According to various embodiments, a method for determining access grant may be provided. The method may include: providing a request to start a game to a first user and to a second user, determining a winner of the game; and granting access to a device based on the determination of the winner of the game.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 2 to 7 show illustrations including screen shots of devices according to various embodiments.

DETAILED DESCRIPTION

Figure 1A:
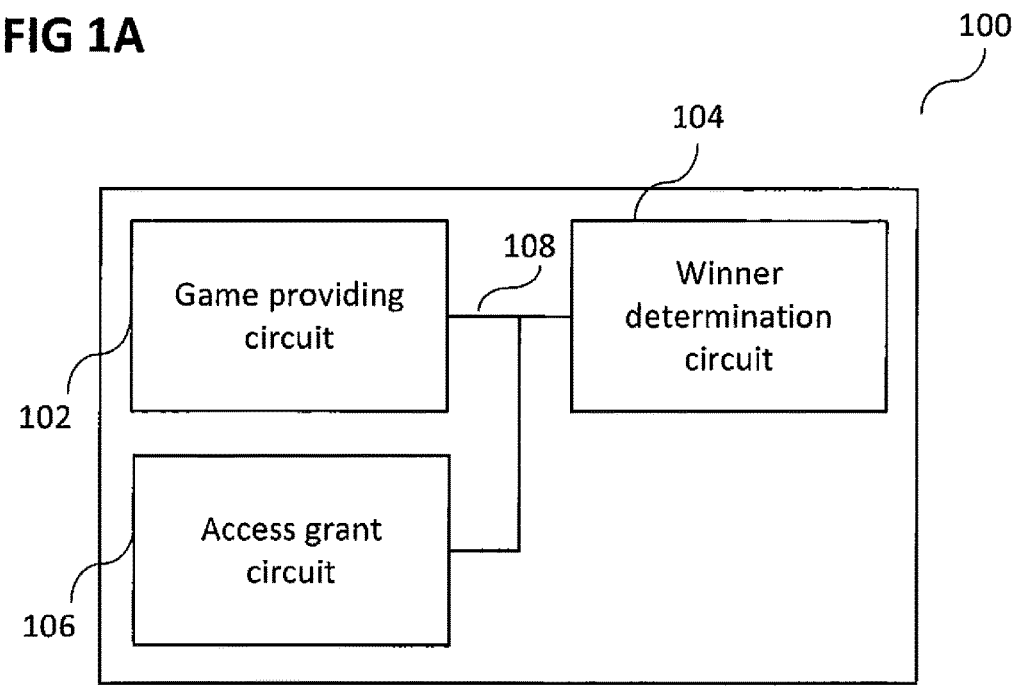
FIG. 1A shows an access grant determination device according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the access grant determination device as described in this description may include a memory which is for example used in the processing carried out in the access grant determination device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

When looking at a remote control (for example a TV remote control) as a software application, one cannot simply say "give me the remote", as they would be taking that person's personal computing device i.e. their smartphone or tablet. According to various embodiments, there may be provided a way to pass the remote control when using a remote control application without actually passing the device on which the remote control application is executed.

Due to the way a software remote (in other words: a software remote control; in other words: a remote application (in other words: app); in other words: a remote control application) communicates with the TV, it may not be possible for a second software remote to communicate with the TV at the same time, so that a second user cannot simply change the channel, and the second user would have to ask for the remote control (for example the device, on which the first software remote is executed), which may lead to the problem as stated above.

None of the presently available TV remote software applications has a feature or solution for changing possession of the remote other than simply giving the actual physical device to a different user (same as with a physical TV remote) or closing their remote app and the second user turns on the remote app on their device.

According to various embodiments, these problems are solved by provided a "Battle for the Remote" feature. This may allow a second user a chance to virtually take the remote by using a challenge system. In order for this to work, both users may have the TV remote application installed on their smartphone/tablet Users may download these apps from an app store, dependent on their device type. Once a user has connected to a TV set top box, they have control of the TV set top box for the duration of their connection, i.e. if they close their TV remote app or power off their smartphone or tablet, they will relinquish control automatically. While the first user to connect has control of the remote, the second user may launch their remote application and they will receive a "Busy" signal, meaning that the TV set top box cannot take any input. The second user may also see a "Battle?" button. If the second user (who may be referred to as User 2) pushes this button, the second user may in effect be challenging the first user (who may be referred to as User 1) for the remote. User 1 may receive a notification on his remote screen that User 2 has challenged him followed by short countdown sequence. At the end of the sequence the "battle" may begin and both users may be asked to participate in a competitive head-to-head mini game; in this case, for example, each user may tap their screen repeatedly as fast as they can, with the winner gaining "control" of the remote.

FIG. 1A shows an access grant determination device 100 according to various embodiments. The access grant determination device 100 may include a game providing circuit 102 configured to provide a request to start a game to a first user and to a second user (wherein for example both users use a device on which a remote control application is running). The access grant determination device 100 may further include a winner determination circuit 104 configured to determine a winner of the game. The access grant determination device 100 may further include an access grant circuit 106 configured to grant access to a device (for example the device for which the remote control application provides remote control, and wherein for example access grant determination device 100 may be provided in the device for which access is granted) based on the determination of the winner of the game. The game providing circuit 102, the winner determination circuit 104, and the access grant circuit 106 may be connected (in other words: coupled) via a connection 108 (or a plurality of separate connections), for example an electrical or optical connection, for example any kind of cable or bus.

In other words, according to various embodiments, access to a device may be managed based on who wins a game.

According to various embodiments, the access grant circuit 106 may further be configured to grant access to the device to the winner of the game.

According to various embodiments, the device may include or may be or may be included in a television device.

According to various embodiments, the first user and the second user may use a same application for access to the device.

According to various embodiments, the game providing circuit 102 may further be configured to receive a request for providing the game from a user presently not controlling the device.

According to various embodiments, the game providing circuit 102 may further be configured to transmit a challenge notification to a user presently controlling the device.

According to various embodiments, the game providing circuit 102 may further be configured to determine whether the user presently controlling accepts or rejects the challenge.

According to various embodiments, the game providing circuit 102 may further be configured to reject a request for providing the game from a user who has lost a previous game in a pre-determined period of time.

According to various embodiments, the game may include or may be or may be included in a game of tapping a button as fast as possible.

According to various embodiments, the game may include or may be or may be included in a game of tapping a button as often as possible in a predetermined period of time.

According to various embodiments, the game providing circuit 102 may be configured to provide a start signal to the first user and the second user.

According to various embodiments, the game may include or may be or may be included in a game of tapping as soon as possible after the start signal is received.

According to various embodiments, the game may include or may be or may be included in a game of shake a user device as fast as possible.

According to various embodiments, the game may include or may be or may be included in a game of answering a question.

According to various embodiments, the question may be provided by user presently controlling the device.

According to various embodiments, the access grant determination device may be provided in a user device used by a user presently not controlling the device.

According to various embodiments, the access grant determination device may be provided in a user device used by a user presently controlling the device.

Figure 1B:
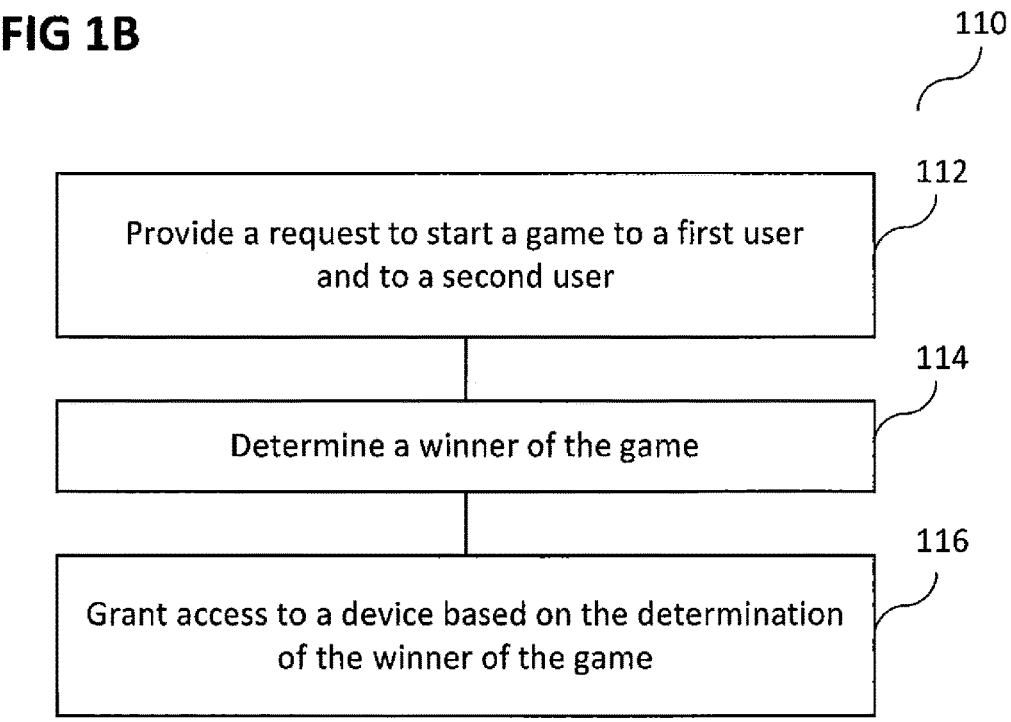
FIG. 1B shows a flow diagram illustrating a method for determining access grant.

FIG. 1B shows a flow diagram 110 illustrating a method for determining access grant. In 112, a request to start a game may be provided to a first user and to a second user. In 114, a winner of the game may be determined. In 116, access to a device may be granted based on the determination of the winner of the game.

According to various embodiments, the method may further include granting access to the device to the winner of the game.

According to various embodiments, the device may include or may be or may be included in a television device.

According to various embodiments, the first user and the second user may use a same application for access to the device.

According to various embodiments, the method may further include receiving a request for providing the game from a user presently not controlling the device.

According to various embodiments, the method may further include transmitting a challenge notification to a user presently controlling the device.

According to various embodiments, the method may further include determining whether the user presently controlling accepts or rejects the challenge.

According to various embodiments, the method may further include rejecting a request for providing the game from a user who has lost a previous game in a pre-determined period of time.

According to various embodiments, the game may include or may be or may be included in a game of tapping a button as fast as possible.

According to various embodiments, the game may include or may be or may be included in a game of tapping a button as often as possible in a pre-determined period of time.

According to various embodiments, the method may further include providing a start signal to the first user and the second user.

According to various embodiments, the game may include or may be or may be included in a game of tapping as soon as possible after the start signal is received.

According to various embodiments, the game may include or may be or may be included in a game of shake a user device as fast as possible.

According to various embodiments, the game may include or may be or may be included in a game of answering a question.

According to various embodiments, the question may be provided by user presently controlling the device.

According to various embodiments, the method may be performed in a user device used by a user presently not controlling the device.

According to various embodiments, the method may be performed in a user device used by a user presently controlling the device.

According to various embodiments, the methods and devices may be referred to as "Remote Supremacy" or as "Razer Remote Supremacy".

According to various embodiments, a method may be provided by which possession of a TV (television) remote control software application (for example a TV remote app) can change from one user's device to another by having the current possessor of the TV remote app notified of another user who wishes to gain possession (for example via a challenge game).

According to various embodiments, the owner of control of the TV remote app may be challenged by anyone with the same app.

According to various embodiments, the owner may accept or deny any challenge.

According to various embodiments, the winner may gain control of the remote.

According to various embodiments, the loser may not challenge again for a short period of time.

According to various embodiments, a method for determining who gains possession of the TV remote app is a head to head mini-game consists of both players tapping their device screens as quickly as possible over a given period of time. The player with the most taps may win and the app on the winner's device may now be the controller.

According to various embodiments, another version of the head to head mini-game may be to have both players shake their phones as quickly as possible for a given period of time. The player with the most shakes may win.

According to various embodiments, another version of the head to head mini-game may be the current owner to set a challenge question, if the challenger is correct, the challenger may gain control of the TV remote app.

According to various embodiments, something as simple as changing a TV channel may be taken into a competitive gaming experience.

The devices and methods according to various embodiments may be added as a paid unlock to a premium version of a (for example free) TV remote (in other words: TV remote app).

In the following, an example of a mini-game (tapping) to win control of the remote (which may be referred to as remote fight) from a first user using a remote control application (which may be referred to as remote 1) to a second user using a remote control application (which may be referred to as remote 2) will be described.

FIG. 2 shows an illustration 200 of various screen shots of what is shown on remote 1 and remote 2 according to various embodiments. A screenshot 202 of what is shown on remote 2 may indicate (in the upper left corner of screenshot 202) that the remote control presently controls a device in the living room. As indicated by screen shot 204, a user may touch the screen (as indicated by hand 206) to change from controlling a device in the living room to controlling a device in the bedroom. As shown by screen shot 208, on the remote 1, which is presently controlling the device in the bedroom (in the upper left corner of screenshot 208), a notification of the challenge may be displayed. The user of remote 1 may, like indicated by hand 210, accept the challenge by pressing the fight button (which may be a virtual button).

Figure 3:
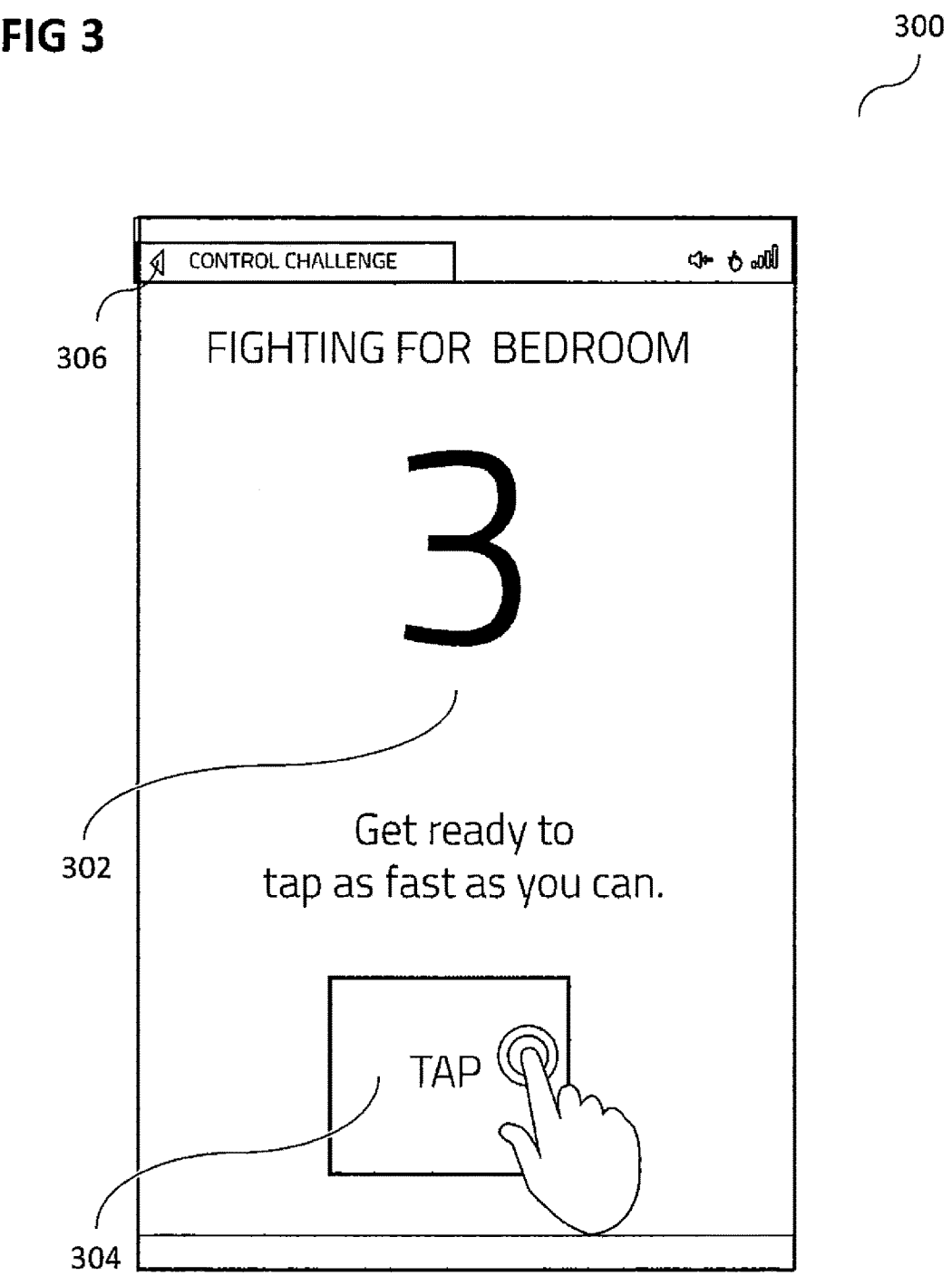

FIG. 3 shows a screen shot 300 of what is shown on remote 1 and remote 2 according to various embodiments. A countdown 302 is shown (for example providing a countdown from a pre-determined integer number (for example from 3, for example "3, 2, 1").

The user of remote 1 or remote 2 may use the "<" symbol 306 to cancel. The user may tap on symbol 306 to go back to the screen which says "<User> wants to take control of <TV set top box name>" and there they can either Release or Fight (for example like shown on screen short 208 of FIG. 8). In this case, if the user had accepted the Fight but then decided to just give up he could tap on symbol 306 to go back to the "Control Challenge" to reconsider.

A button 304 may be provided on the devices of both the user of remote 1 and the user of remote 2. The button 304 may not yet be depressible during the countdown, but may rather provide an instruction to the user.

Figure 4:
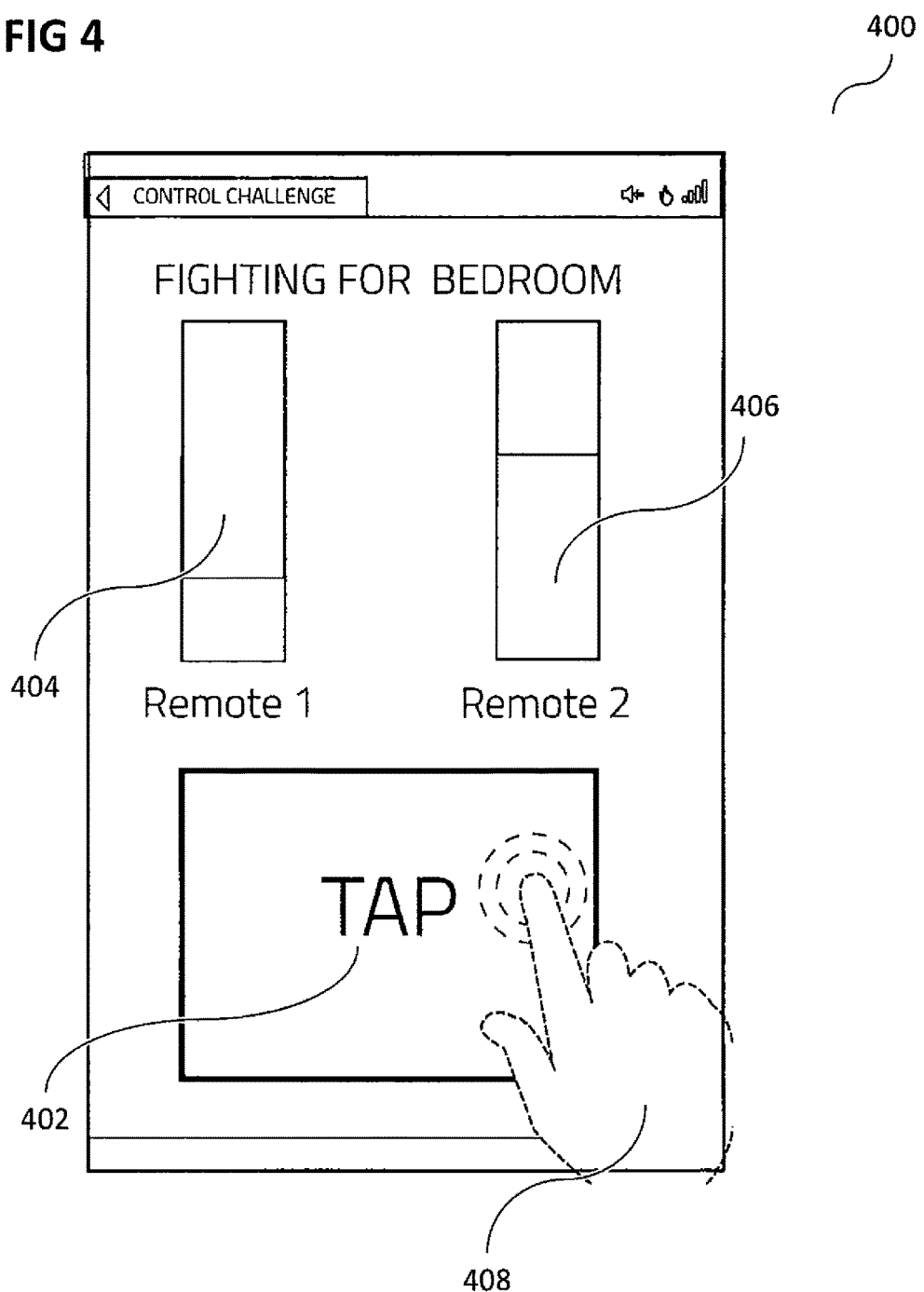

FIG. 4 shows an illustration 400 including a screen shot of what is shown on remote 1 and remote 2 according to various embodiments. The user of the respective device may be supposed to press button 402 as fast as possible, like indicated by hand 408 pressing the button 402. Both users may have a pre-determined period of time to press as often as they can (for example a 10 second fight). A first diagram 404 may indicate how often the user of the device as shown in FIG. 4 has pressed the button. A second diagram 406 may indicate how often the opponent of user of the device as shown in FIG. 4 has pressed the button. The leader may be shown in green in diagrams 404 and 406.

Figure 5:
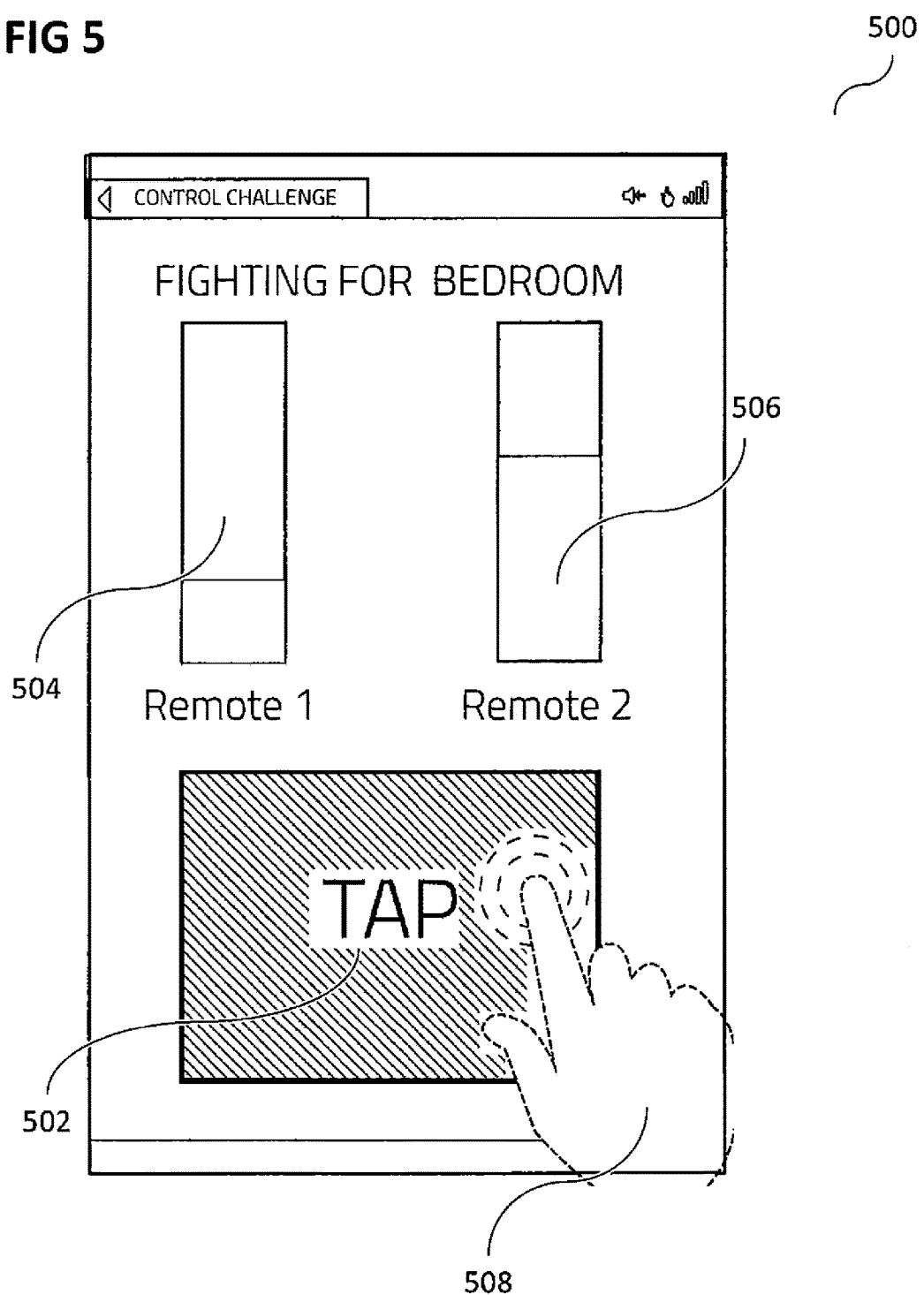

FIG. 5 shows an illustration 500 including a screen shot of what is shown on remote 1 and remote 2 according to various embodiments. The user of the respective device may be supposed to press button 502 as fast as possible, like indicated by hand 508 pressing the button 502. A first diagram 504 may indicate how often the user of the device as shown in FIG. 5 has pressed the button. A second diagram 506 may indicate how often the opponent of user of the device as shown in FIG. 5 has pressed the button. The button 502 may give feedback on taps, for example by changing its appearance, for example by changing its color.

Figure 6:
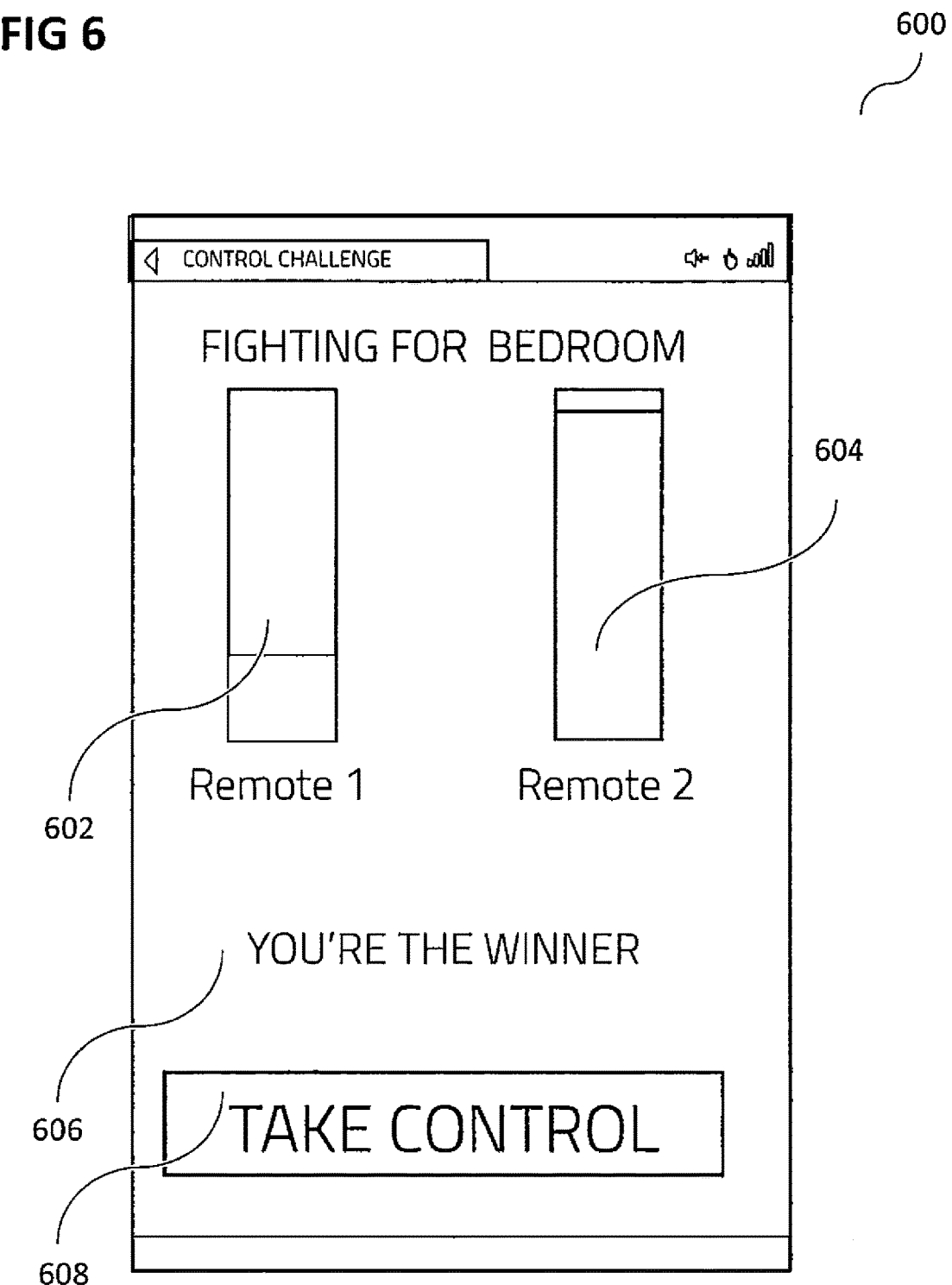

FIG. 6 shows a screen shot 600 of what is shown to the device winning the fight for the remote (for example on remote 1) according to various embodiments. A first diagram 602 and a second diagram 604 may indicate how often the two users have pressed the button. A winning message 606 may be shown to the winner of the fight for the remote. Furthermore, a button 608 to take control over the remote control may be provided.

Figure 7:
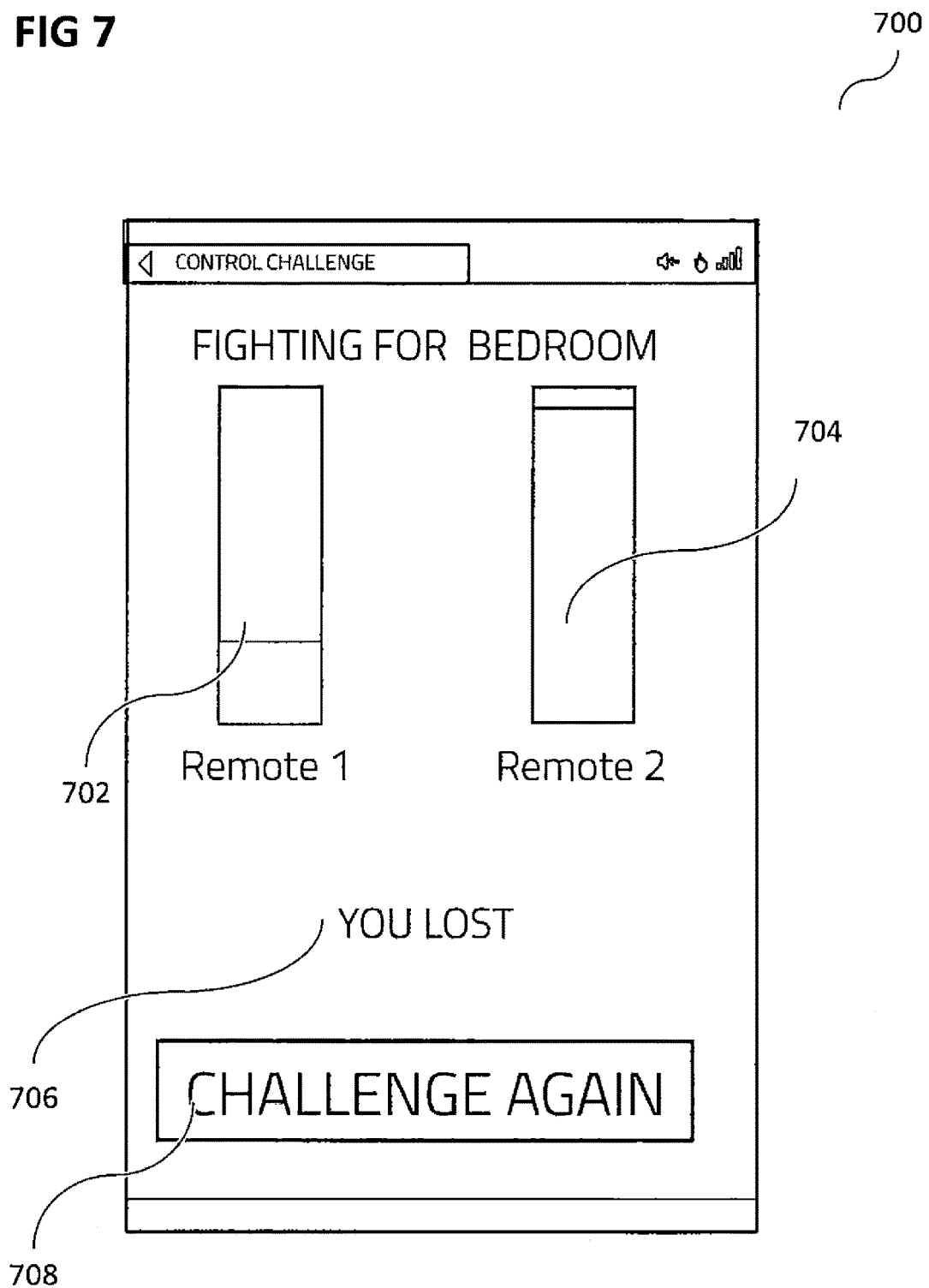

FIG. 7 shows a screen shot 700 of what is shown to the device winning the fight for the remote (for example on remote 1) according to various embodiments. A first diagram 702 and a second diagram 704 may indicate how often the two users have pressed the button. A winning losing message 706 may be shown to the loser. Furthermore, a button 708 to challenge the winner of the fight for the remote may be provided.

Figure 8:
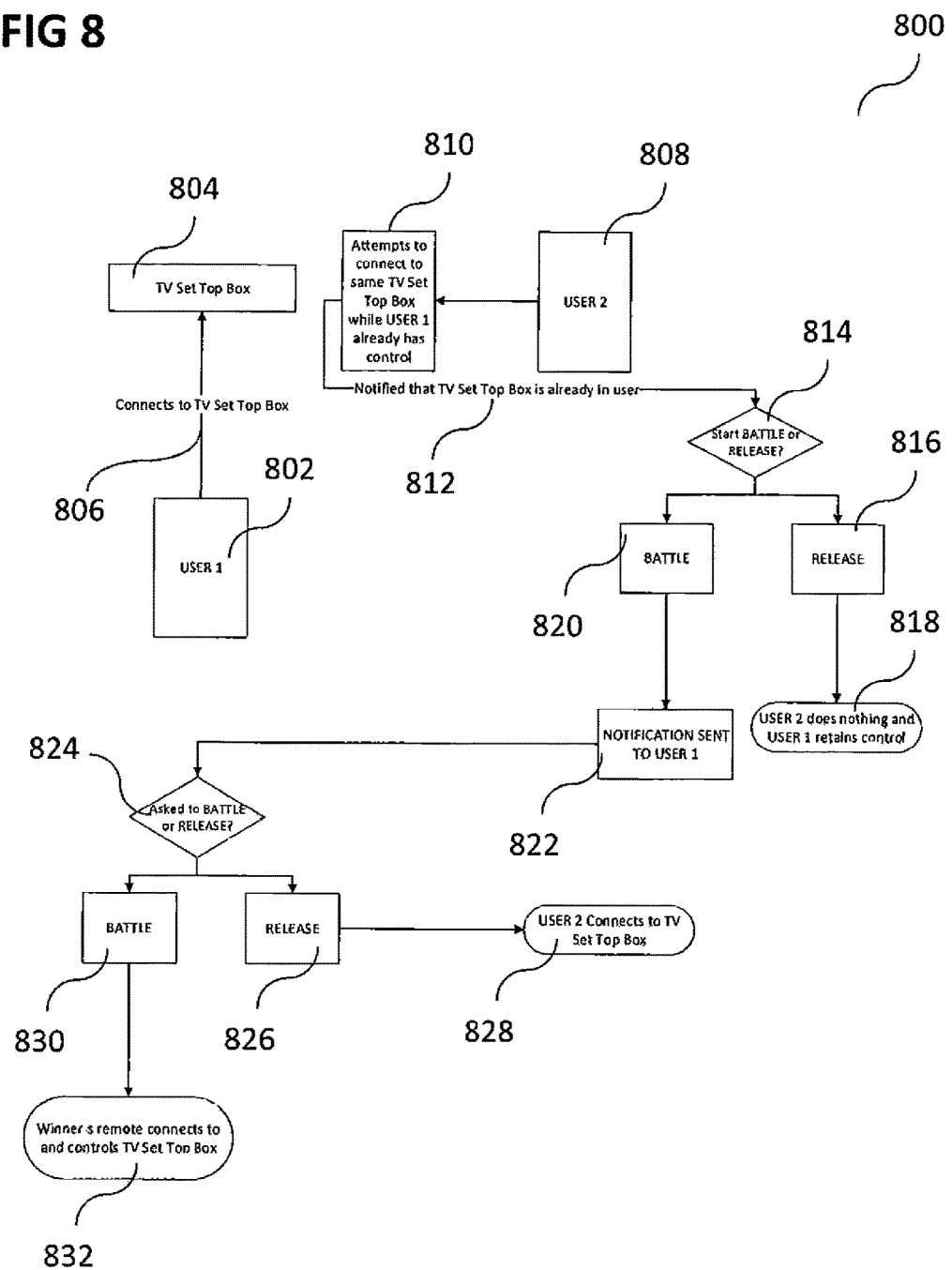
FIG. 8 shows a flow diagram 800 illustrating a method for determining access grant according to various embodiments.

FIG. 8 shows a flow diagram 800 illustrating a method for determining access grant according to various embodiments. A first user 802 may connect to a TV set top box 804, like indicated by arrow 806. In 810, a second user 808 (in other words: user 2) may attempt to connect to the save TV set top box which user 1 (in other words: a first user) already controls. Like indicated by arrow 812, the second user may be notified that the TV set top box is already in use (for example by user 1). In 814, the second user may choose whether to battle or to release his request for remote controlling the TV set top box. In case the second user decides to release (in 816), the second user does not do anything and the first user may retain control over the TV set top box (in 818). In case the second user decides to battle (in 820), a notification may be sent to the first user in 822. In 824, the first user may be asked whether he wants to battle or to release. In case the first user decides to release (in 826), the second user may connect to the TV set top box in 828, and thus may obtain control over the TV set top box. In case the first user decides to battle (in 830), a battle (in other words: a fight for the remote) may be carried out, and in 832, the winner's remote may connect to the TV set top box and may control it.

It will be understood that although FIG. 8 has been described in the example of controlling a TV set top box and remote controls for the TV set top box, it will be understood that the method of FIG. 8 may be performed for any wireless devices (for example remote controls in FIG. 8) communicating with a host device (for example TV set top box in FIG. 8).

According to various embodiments, a mundane act a fun, meaningful interaction between two people may be provided.

According to various embodiments, the determination of the winner may be done by means of a contest, for example a game. According to various embodiments there may be various variations of this game cosmetically, but they may all share the same characteristic in that the object is for both users to complete the same task at the same time and the winner is whomever completes the task first.

According to various embodiments, this may be represented with two bars or boxes, for example a red one and a blue one. The currently connected user (or "CCU") may be represented by the red box and the requesting user (or "RU") may be represented by the blue box. When the battle starts, each user's box may be empty and every time the users tap on their device screen, their (respective) box fills up. The first one to fill his or her box wins the battle.

According to various embodiments, both users may be connecting to the set top box and this may be where the data flow between devices takes place. This may be how the how the RU sends their battle request, the CCU receives notification of the battle request, the determination of the winner and the switching of control if the winner desires is carried out.

According to various embodiments, the following products or services may be provided: an addition to a remote app (for example a TV remote app), a standalone application that may be part of a game, or a service that ties into a user account profile for example for leaderboards earning achievements, badges, or fame. For example, this may be taken as a mechanic for a family game with no actual interaction with the TV set top box itself. For example, a kid's app (for example called "Family Fun") may be provided that can be downloaded on various devices in a given household. If a child wanted to watch a particular show but the parents were already watching one of their own, they could use this app to challenge them for fun, with no actual impact to who controls the TV. Another example would be to use this app as a standalone for any disputed chore in a household. College students who are roommates might hate doing dishes for example. For example, roommate A may launch this standalone app, may find roommate B in his friends list and may send her a notification requesting a battle with the winner having to do the day's dishes. Roommate B, who may be on her way to her next class, may accept and they may battle it out in 10 seconds or less, and the winner may avoid chores. This may be further extended and user profiles, Win-Loss records, badges and more may be maintained.

The following examples pertain to further embodiments.

Example 1 is an access grant determination device comprising: a game providing circuit configured to provide a request to start a game to a first user and to a second user; a winner determination circuit configured to determine a winner of the game; and an access grant circuit configured to grant access to a device based on the determination of the winner of the game.

In example 2, the subject-matter of example 1 can optionally include that the access grant circuit is further configured to grant access to the device to the winner of the game.

In example 3, the subject-matter of any one of examples 1 to 2 can optionally include that the device is a television device.

In example 4, the subject-matter of any one of examples 1 to 3 can optionally include that the first user and the second user use a same application for access to the device.

In example 5, the subject-matter of any one of examples 1 to 4 can optionally include that the game providing circuit is further configured to receive a request for providing the game from a user presently not controlling the device.

In example 6, the subject-matter of any one of examples 1 to 5 can optionally include that the game providing circuit is further configured to transmit a challenge notification to a user presently controlling the device.

In example 7, the subject-matter of any one of examples 1 to 6 can optionally include that the game providing circuit is further configured to determine whether the user presently controlling accepts or rejects the challenge.

In example 8, the subject-matter of any one of examples 1 to 7 can optionally include that the game providing circuit is further configured to reject a request for providing the game from a user who has lost a previous game in a pre-determined period of time.

In example 9, the subject-matter of any one of examples 1 to 8 can optionally include that the game comprises a game of tapping a button as fast as possible.

In example 10, the subject-matter of any one of examples 1 to 9 can optionally include that the game comprises a game of tapping a button as often as possible in a pre-determined period of time.

In example 11, the subject-matter of any one of examples 1 to 10 can optionally include that the game providing circuit is configured to provide a start signal to the first user and the second user.

In example 12, the subject-matter of example 11 can optionally include that the game comprises a game of tapping as soon as possible after the start signal is received.

In example 13, the subject-matter of any one of examples 1 to 12 can optionally include that the game comprises a game of shake a user device as fast as possible.

In example 14, the subject-matter of any one of examples 1 to 13 can optionally include that the game comprises a game of answering a question.

In example 15, the subject-matter of example 14 can optionally include that the question is provided by user presently controlling the device.

In example 16, the subject-matter of any one of examples 1 to 15 can optionally include that the access grant determination device is provided in a user device used by a user presently not controlling the device.

In example 17, the subject-matter of any one of examples 1 to 16 can optionally include that the access grant determination device is provided in a user device used by a user presently controlling the device.

Example 18 is a method for determining access grant, the method comprising: providing a request to start a game to a first user and to a second user; determining a winner of the game; and granting access to a device based on the determination of the winner of the game.

In example 19, the subject-matter of example 18 can optionally include: granting access to the device to the winner of the game.

In example 20, the subject-matter of any one of examples 18 to 19 can optionally include that the device is a television device.

In example 21, the subject-matter of any one of examples 18 to 20 can optionally include that the first user and the second user use a same application for access to the device.

In example 22, the subject-matter of any one of examples 18 to 21 can optionally include: receiving a request for providing the game from a user presently not controlling the device.

In example 23, the subject-matter of any one of examples 18 to 22 can optionally include: transmitting a challenge notification to a user presently controlling the device.

In example 24, the subject-matter of any one of examples 18 to 23 can optionally include: determining whether the user presently controlling accepts or rejects the challenge.

In example 25, the subject-matter of any one of examples 18 to 24 can optionally include: rejecting a request for providing the game from a user who has lost a previous game in a pre-determined period of time.

In example 26, the subject-matter of any one of examples 18 to 25 can optionally include that the game comprises a game of tapping a button as fast as possible.

In example 27, the subject-matter of any one of examples 18 to 26 can optionally include that the game comprises a game of tapping a button as often as possible in a pre-determined period of time.

In example 28, the subject-matter of any one of examples 18 to 27 can optionally include: providing a start signal to the first user and the second user.

In example 29, the subject-matter of example 28 can optionally include that the game comprises a game of tapping as soon as possible after the start signal is received.

In example 30, the subject-matter of any one of examples 18 to 29 can optionally include that the game comprises a game of shake a user device as fast as possible.

In example 31, the subject-matter of any one of examples 18 to 30 can optionally include that the game comprises a game of answering a question.

In example 32, the subject-matter of example 31 can optionally include that the question is provided by user presently controlling the device.

In example 33, the subject-matter of any one of examples 18 to 32 can optionally include that the method is performed in a user device used by a user presently not controlling the device.

In example 34, the subject-matter of any one of examples 18 to 33 can optionally include that the method is performed in a user device used by a user presently controlling the device.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An access grant determination device comprising:
a memory; and
at least one processor coupled to the memory and configured to:
transmit a notification of a challenge to a first user device;
determine whether a first user on the first user device accepts or rejects the challenge;
determine whether a request for providing a game is from a user who has lost a previous game in a pre-determined period of time;
provide the request to start the game to the first user on the first user device and to a second user on a second user device when the first user accepts the challenge and when the request for providing the game is not from a user who has lost a previous game in the pre-determined period of time, the first user device having a control of a third device before the providing of the request to start the game;
determine a winner of the game; and
grant the control of the third device from the first user device to the second user device when the second user is determined to be the winner of the game, the control of the third device being released by the first user device in response to the control being granted to the second user device.

2. The access grant determination device of claim 1, wherein the third device is a television device.

3. The access grant determination device of claim 1, wherein the first user and the second user use a same application for access to the third device.

4. The access grant determination device of claim 1, wherein the at least one processor is further configured to receive a request for providing the game from the second user device.

5. The access grant determination device of claim 1, wherein the game comprises one of a game of tapping a button as fast as possible, or a game of tapping a button as often as possible in a pre-determined period of time, or a game of shaking a user device as fast as possible.

6. The access grant determination device of claim 1, wherein the at least one processor is configured to provide a start signal to the first user and the second user.

7. The access grant determination device of claim 6, wherein the game comprises a game of tapping as soon as possible after the start signal is received.

8. The access grant determination device of claim 1, wherein the access grant determination device is provided in at least one of the first user device or the second user device.

9. A method for determining access grant, the method comprising:

transmitting a notification of a challenge to a first user device;

determining whether a first user on the first user device accepts or rejects the challenge;

determining whether a request for providing a game is from a user who has lost a previous game in a pre-determined period of time;

providing the request to start the game to the first user on the first user device and to a second user on a second user device when the first user accepts the challenge and when the request for providing the game is not from a user who has lost a previous game in the pre-determined period of time, the first user device having a control of a third device before the providing of the request to start the game;

determining a winner of the game; and granting the control of the third device from the first user device to the second user device when the second user is determined to be the winner of the game, the control of the third device being released by the first user device in response to the control being granted to the second user device.

10. The method of claim 9, further comprising:

receiving a request for providing the game from the second user device.

11. The method of claim 9, wherein the method is performed in at least one of the first user device or the second user device.

* * * * *